United States Patent
Vojak (10) Patent No.: US 9,323,447 B2
(45) Date of Patent: Apr. 26, 2016

(54) ELECTRONIC WHITEBOARD AND TOUCH SCREEN METHOD FOR CONFIGURING AND APPLYING METADATA TAGS THEREON

(71) Applicant: Sharp Laboratories of America, Inc., Camas, WA (US)

(72) Inventor: William John Vojak, Battle Ground, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 159 days.

(21) Appl. No.: 14/054,380

(22) Filed: Oct. 15, 2013

(65) Prior Publication Data

US 2015/0106746 A1    Apr. 16, 2015

(51) Int. Cl.
*G06F 3/0488* (2013.01)
*G06F 3/0484* (2013.01)
*G06F 3/0482* (2013.01)

(52) U.S. Cl.
CPC .......... *G06F 3/0488* (2013.01); *G06F 3/04842* (2013.01)

(58) Field of Classification Search
CPC . G06F 3/0482; G06F 3/04842; G06F 3/0488; G06F 3/0484; G06F 3/04886; G06F 17/30058
See application file for complete search history.

(56) References Cited

U.S. PATENT DOCUMENTS

| | | | |
|---|---|---|---|
| 5,880,743 A | 3/1999 | Moran et al. | |
| 5,970,455 A | 10/1999 | Wilcox et al. | |
| 6,018,346 A | 1/2000 | Moran et al. | |
| 7,310,780 B2 | 12/2007 | Diering et al. | |
| 7,634,729 B2 | 12/2009 | Lerner et al. | |
| 8,041,120 B2 | 10/2011 | Zhang et al. | |
| 2002/0023110 A1 | 2/2002 | Fortin et al. | |
| 2002/0138541 A1 | 9/2002 | Wolff et al. | |
| 2002/0163548 A1 | 11/2002 | Chiu et al. | |
| 2004/0044958 A1 | 3/2004 | Wolf et al. | |
| 2005/0005241 A1 | 1/2005 | Hunleth et al. | |
| 2005/0039145 A1 | 2/2005 | Diering et al. | |
| 2006/0061595 A1 | 3/2006 | Goede et al. | |
| 2007/0030257 A1* | 2/2007 | Bhogal et al. | 345/179 |
| 2009/0003703 A1 | 1/2009 | Zhang et al. | |
| 2010/0077333 A1 | 3/2010 | Yang et al. | |
| 2011/0225156 A1 | 9/2011 | Pavlik | |
| 2011/0246875 A1 | 10/2011 | Parker et al. | |
| 2012/0005592 A1 | 1/2012 | Joshi | |
| 2012/0131511 A1* | 5/2012 | Park | 715/841 |

(Continued)

FOREIGN PATENT DOCUMENTS

| | | |
|---|---|---|
| GB | 2329813 | 3/1999 |
| JP | 2009-245196 | 10/2009 |

(Continued)

OTHER PUBLICATIONS

FX Palo Alto Library, "ReBoard: Reimagining Office Whiteboards," <www.fxpal.com/?p=reboard> 1999-2013, 4 pages.

(Continued)

*Primary Examiner* — Amy Ng
*Assistant Examiner* — Tan Tran
(74) *Attorney, Agent, or Firm* — Scot A. Reader (57) ABSTRACT

An electronic whiteboard and a touch screen method for configuring and applying metadata tags on an electronic whiteboard allows user-defined and user-classified metadata tags to be configured and applied to objects "on the fly" through touch screen inputs on the electronic whiteboard, providing object tagging in electronic whiteboard sessions that is less cumbersome, less disruptive to creative flow and more precise than conventional methods.

17 Claims, 6 Drawing Sheets

(56) References Cited

U.S. PATENT DOCUMENTS

2013/0201161 A1* 8/2013 Dolan et al. .................. 345/179
2013/0218935 A1 8/2013 Katou
2015/0007055 A1* 1/2015 Lemus et al. ................. 715/753

FOREIGN PATENT DOCUMENTS

| JP | 2010-129083 | 6/2010 |
|---|---|---|
| JP | 2012-063890 | 3/2012 |
| WO | WO9809270 | 3/1998 |

OTHER PUBLICATIONS

G. Golovchinsky et al., "Beyond the Drawing Board: Toward More Effective Use of Whiteboard Content," <www.madpickle.net/scott/pubs/0911.0039.pdf> 2009, 10 pages.

\* cited by examiner

ELECTRONIC WHITEBOARD AND TOUCH SCREEN METHOD FOR CONFIGURING AND APPLYING METADATA TAGS THEREON

BACKGROUND OF THE INVENTION

The present invention relates to tagging objects displayed on touch screen enabled devices, such as electronic white boards, with metadata.

Electronic whiteboards, or eBoards, are interactive electronic display panels having touch screen interfaces. They are often used in educational and collaborative work environments to display slides and documents and mark them up with digital ink using touch screen inputs.

During an electronic whiteboard session, it is sometimes useful to tag objects in slides or documents being displayed with metadata that describes the objects and allows them to be more easily located, grouped and sorted in later browsing and searching sessions. These metadata tags typically take the form of descriptive text strings.

One conventional method of tagging objects displayed on an electronic whiteboard with metadata invokes an auxiliary computer. This tagging method requires connecting the auxiliary computer to the electronic whiteboard and navigating a user interface on the auxiliary computer to configure the tags and apply them to objects, which can be cumbersome and disrupt the creative flow of the electronic whiteboard session.

Another conventional method of tagging objects displayed on an electronic whiteboard with metadata requires the user to select among factory-configured tags stored on the electronic whiteboard, such as a "Priority" tag. This tagging method, while in certain respects less cumbersome than the method that relies on an auxiliary device, can still be disruptive to the flow of the electronic whiteboard session since the factory-configured tags are often not classified well enough for an electronic whiteboard user to find the best tag in a timely manner. Moreover, this tagging method has limited value since the factory-configured tags are often too generic to describe tagged objects in a way that allows them to be efficiently located, grouped and sorted in later browsing and searching sessions.

SUMMARY OF THE INVENTION

The present invention provides an electronic whiteboard and a touch screen method for configuring and applying metadata tags on an electronic whiteboard. The invention allows user-defined and user-classified metadata tags to be configured and applied to objects "on the fly" through touch screen inputs on the electronic whiteboard, providing object tagging in electronic whiteboard sessions that is less cumbersome, less disruptive to creative flow and more precise than conventional methods.

In one aspect of the invention, a touch screen method for configuring and applying metadata tags on an electronic whiteboard comprises: receiving as first touch screen input on the electronic whiteboard a tag class configuration instruction identifying a metadata tag class; receiving as second touch screen input on the electronic whiteboard a plurality of metadata tags for inclusion in the metadata tag class; associating in a memory on the electronic whiteboard the metadata tag class and the metadata tags; receiving as third touch screen input on the electronic whiteboard an object tagging instruction identifying an object on the electronic whiteboard to be tagged with metadata; generating on the electronic whiteboard using the associated metadata tag class and metadata tags a hierarchical selection menu including the metadata tag class as a selectable option on a first level and the metadata tags as selectable options on a second level; outputting on the electronic whiteboard the hierarchical selection menu; and receiving as fourth touch screen input on the electronic whiteboard a selection from the hierarchical selection menu of one of the metadata tags.

In some embodiments, the tag class configuration instruction comprises a handwritten gesture in a syntax recognized by the electronic whiteboard as a tag class configuration instruction.

In some embodiments, the handwritten gesture comprises a tag class configuration notation accompanying a word identifying the metadata tag class.

In some embodiments, the metadata tags are received as handwritten words in a format recognized by the electronic whiteboard as metadata tags.

In some embodiments, the handwritten words are written into empty cells of a tag list for the metadata tag class outputted on the electronic whiteboard in response to the tag class configuration instruction.

In some embodiments, the metadata tags are reformatted as computer-generated text strings by the electronic whiteboard prior to the associating step.

In some embodiments, the object tagging instruction comprises a handwritten gesture in a syntax recognized by the electronic whiteboard as an object tagging instruction.

In some embodiments, the hierarchical menu is a cascading menu.

In some embodiments, the second level of the hierarchical selection menu is outputted in response to a selection of the metadata tag class on the first level of the hierarchical selection menu.

In some embodiments, the method further comprises receiving as touch screen input on the electronic whiteboard a plurality of priorities for the metadata tags, respectively.

In some embodiments, the metadata tags are ordered on the second level of the hierarchical selection menu in accordance with their respective priorities.

In another aspect of the invention, an electronic whiteboard comprises: a memory; a touch screen interface configured to receive as first input a tag class configuration instruction identifying a metadata tag class, receive as second input a plurality of metadata tags for inclusion in the metadata tag class, receive as third input an object tagging instruction identifying an object to be tagged with metadata, display as output a hierarchical selection menu including the metadata tag class as a selectable option on a first level and the metadata tags as selectable options on a second level and receive as fourth input a selection from the hierarchical selection menu of one of the metadata tags; and a processor communicatively coupled with memory and the touch screen interface configured to associate in the memory the metadata tag class and the metadata tags in response to the second input and generate the hierarchical selection menu using the associated metadata tag class and metadata tags in response to the third input.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
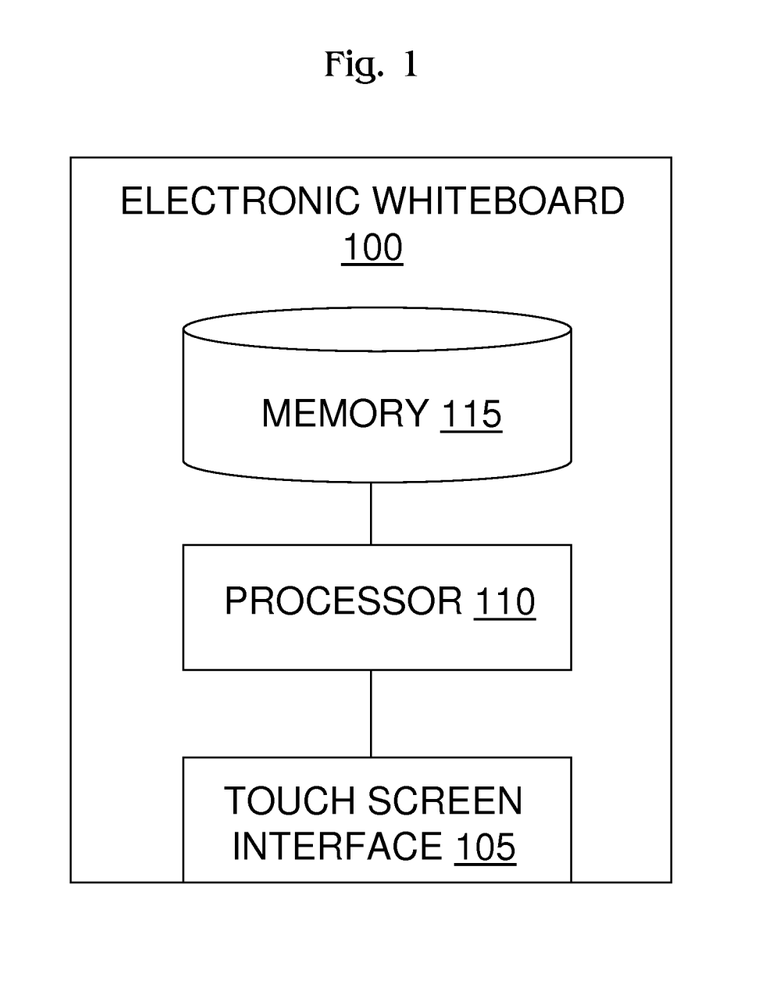
FIG. 1 shows an electronic whiteboard.

FIG. 1 shows an electronic whiteboard 100 in some embodiments of the invention. Whiteboard 100 is an interactive electronic display device having a touch screen interface 105, such as a touch-sensitive light emitting diode (LED) or liquid crystal display (LCD) panel. Whiteboard 100 may be mounted on or to a wall, a table, or another surface. Interface 105 receives touch input, such as finger, digital ink pen or stylus touches, and displays video output, such as presentation slides and collaborative documents. Interface 105 is communicatively coupled with a processor 110, which executes software instructions to interpret touch input and control video output on interface 105. Processor 110 is communicatively coupled with a memory 115 that stores software executed by processor 110 and also stores, under the control of processor 110, user-defined associations between metadata tag classes and tags and user-defined associations between metadata tags and objects.

Figure 2:
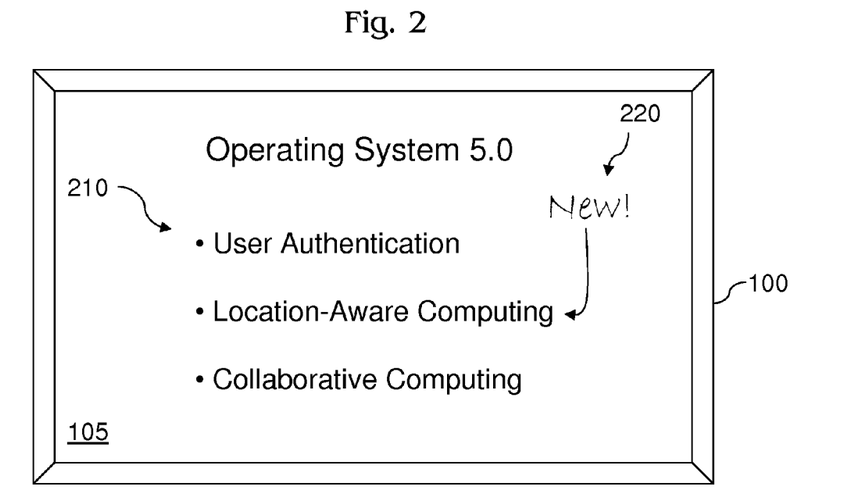
FIG. 2 shows an exemplary presentation slide displayed on an electronic whiteboard.

In a typical electronic whiteboard session, a user of whiteboard 100, such as a presenter, collaborator or meeting attendee, provide touch input by touching interface 105 with a finger or a handheld implement such as a digital ink pen or stylus, enabling the user to enter instructions on whiteboard 100, select and manipulate objects displayed on whiteboard 100 and edit and mark-up video materials displayed on whiteboard 100 with digital ink. By way of example, FIG. 2 shows a presentation slide displayed on interface 105. The presentation slide has keyboard-generated text 210 (e.g., title and bullet points) that is original to the slide as well as handwritten notations 220 that have been added "on the fly" to the slide as digital ink via touch input made on interface 105 during an electronic whiteboard session, either by the person giving the presentation or a member of the audience.

In addition to adding handwritten notations, a user of whiteboard 100 may wish "on the fly" during an electronic whiteboard session to tag an object in a slide or document being displayed on whiteboard 100 with metadata that describes the object and allows it to be more easily located, grouped and sorted in later browsing and searching sessions. To that end, the present invention provides an electronic whiteboard and a touch screen method for use thereon in which user-defined and user-classified metadata tags are configured and applied to objects in response to touch screen inputs, enabling object tagging in electronic whiteboard sessions that is less cumbersome, less disruptive to creative flow and more precise than conventional methods.

Figure 3:
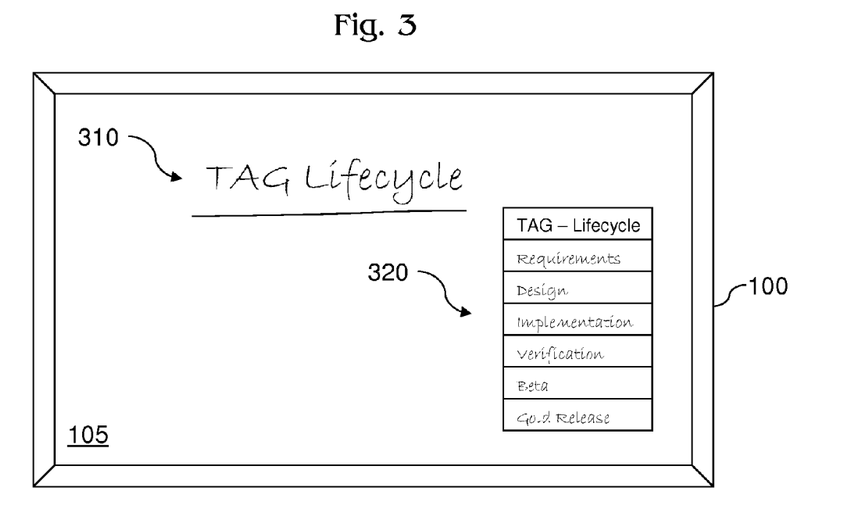
FIG. 3 shows an exemplary tag class configuration instruction and tag list displayed on an electronic whiteboard.
Figure 8:
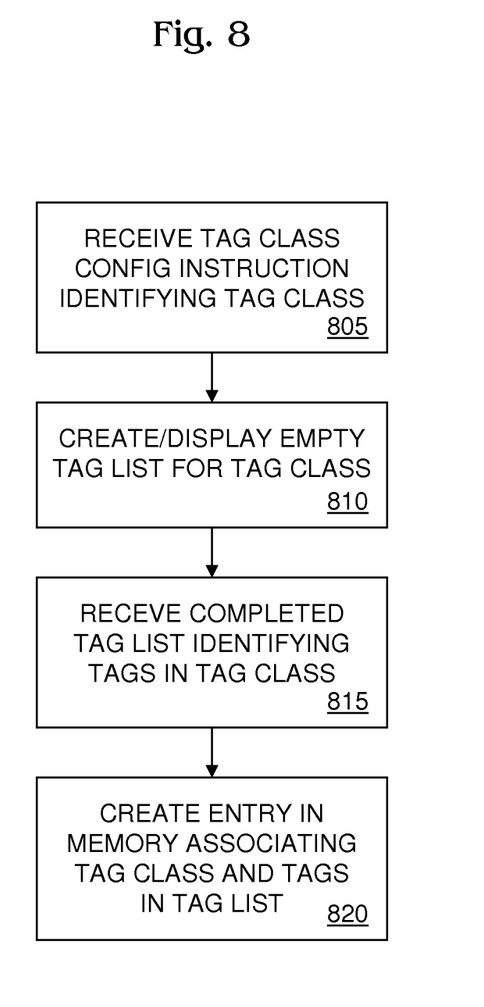
FIG. 8 shows a touch screen method for configuring metadata tags on an electronic whiteboard.

Referring now to FIG. 8, a touch screen method for configuring metadata tags on whiteboard 100 is shown. This method may be carried-out before, during or after an electronic whiteboard session. At the outset, a tag class configuration instruction identifying a metadata tag class to be created is received via touch input by a user on interface 105 (805). The tag class configuration instruction may be a handwritten gesture in a syntax recognized by whiteboard 100 as a tag class configuration instruction. For example, in FIG. 3, a tag class configuration instruction 310 is a handwritten gesture having a tag class configuration notation ("TAG") followed by a word identifying a metadata tag class to be created ("Lifecycle"), with both text elements of the gesture being underlined. Of course, in other embodiments electronic whiteboards may be configured to recognize tag class configuration instructions in other formats. For example, an alternative tag class configuration instruction may include a predetermined handwritten symbol, such as a plus sign or triangle, followed by a handwritten word identifying a metadata tag class to be created, with neither element being underlined.

Next, an empty tag list for the metadata tag class is created and displayed on interface 105 under the control of processor 110 in response to the tag class configuration instruction (810). The tag list identifies the metadata tag class and includes one or more empty cells for receiving metadata tags within the tag class.

Next, a completed tag list identifying metadata tags within the metadata tag class is received via touch input by a user on interface 105 (815). Metadata tags within the metadata tag class are received in a format recognized by processor 110 as metadata tags, for example, as handwritten words entered into empty cells within the tag list. In some embodiments, an empty tag list initially has one cell and an additional cell is added under the control of processor 110 after the first cell is filled-in with a metadata tag. Continuing with the example of FIG. 3, a completed tag list 320 for the metadata tag class "Lifecycle" is shown. The tag list is created and displayed in response to tag class configuration instruction 310 and initially contains a header identifying the metadata tag class "Lifecycle" followed by an empty cell. Once filled-in, completed tag list 320 contains the header followed by a series of cells containing metadata tags entered as handwritten words (e.g., "Requirements," "Design," "Implementation," "Verification," "Beta," "Gold Release").

Next, an entry in memory 115 associating the metadata tag class and the metadata tags in the completed tag list is created under the control of processor 110 (820). In some embodiments, the metadata tags, which are entered as handwritten words, may be reformatted as computer-generated text strings under the control of processor 110 prior to storing the metadata tags in memory 115.

The method of FIG. 8 may be repeated to populate memory 115 with a collection of user-defined and user-classified metadata tags for use in object tagging. Moreover, once an entry for a metadata tag class has been created in memory 115, the metadata tag class may be amended by adding new tags to the class, modifying existing tags within the class, removing existing tags from the class or removing the entire class. A metadata tag class may be amended by providing as touch input on interface 105 a tag class configuration instruction identifying an existing class to be amended, whereupon a completed tag list for the class is generated under the control of processor 110 by accessing the entry for the class in memory 115 and is displayed on interface 105 in an amendable format.

When a class is removed, the user may be prompted via interface 105 to specify whether established associations between tags within the class and objects should be preserved or removed, with action taken by processor 110 in accordance with the user's response to the prompt.

When a tag is removed from a class, the user may be prompted via interface 105 to specify whether established associations between the tag and objects should be preserved or removed, with action being taken by processor 110 consistent with the user's response.

When a removed tag is reinstated to a class, the user may be prompted via interface 105 to specify whether the tag should be automatically associated with any objects with which the removed tag is associated or whether such associations should be removed, with action being taken by processor 110 consistent with the user's response.

As an alternative to handwritten input into an empty cell, a new tag may be added to a class by copying an existing tag from a populated cell, pasting it into an empty cell and renaming it. Where this copying technique is used, the user may be prompted via interface 105 to specify whether the new tag should be automatically associated with objects with which the existing tag is associated, with action being taken by processor 110 consistent with the user's response.

Figure 4:
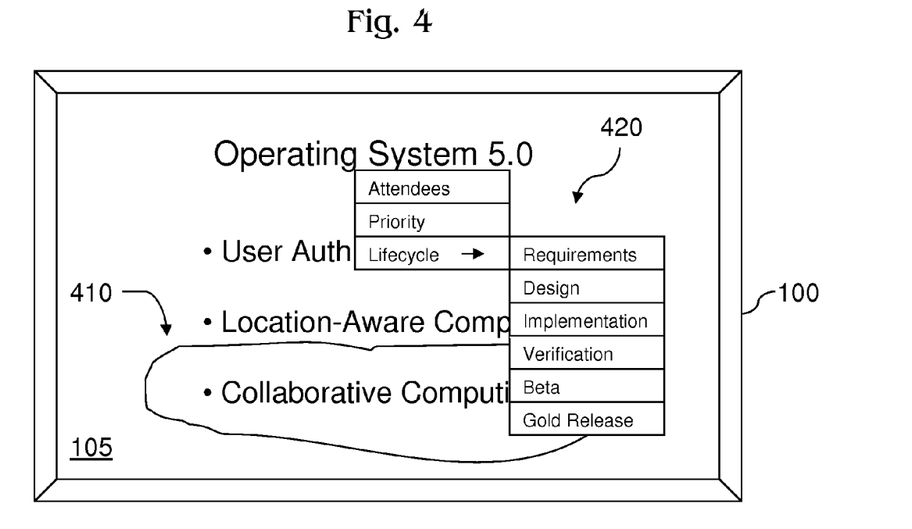
FIG. 4 shows an exemplary object tagging instruction and hierarchical selection menu displayed on an electronic whiteboard.
Figure 9:
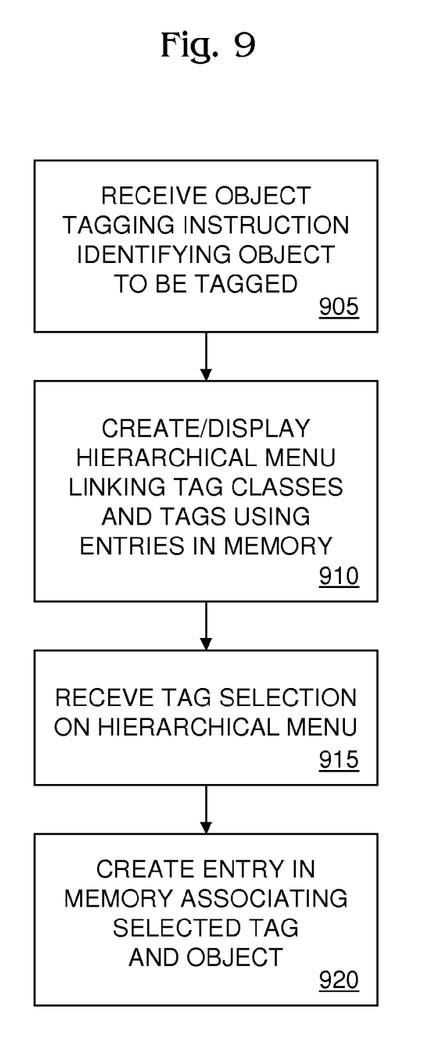
FIG. 9 shows a touch screen method for applying a metadata tag to an object on an electronic whiteboard.

Referring now to FIG. 9, a touch screen method for applying a metadata tag to an object on whiteboard 100 is shown. This method is generally carried-out "on the fly" during an electronic whiteboard session. At the outset, an object tagging instruction identifying an object to be tagged with metadata is received via touch input by a user on interface 105 (905). The object tagging instruction may be a hand-drawn gesture in a syntax recognized by processor 110 as an object tagging instruction. For example, in FIG. 4, an instruction 410 to tag the object "Collaborative Computing" is a hand-drawn gesture made by encircling the displayed object "Collaborative Computing."

Next, a hierarchical selection menu linking metadata tag classes and their associated metadata tags is created and displayed on interface 105 under the control of processor 110 in response to the object tagging instruction (910). The hierarchical selection menu is populated with metadata tag classes and their associated metadata tags accessed from memory 115. The associated classes and tags include those configured in memory 115 through performance of the method of FIG. 8 as well as any factory-configured associated classes and tags. The hierarchical selection menu is in some embodiments a cascading menu that includes the metadata tag classes as selectable options on a first level and their associated metadata tags as selectable options on a second level. In that event, all or a subset of options on the first level are initially displayed. When a user selects one of the options on the first level, the options on the second level that are associated with the selected option on the first level are then displayed in cascade-like fashion. Menu selections are made by a user via touch input on interface 105, such as a finger tap or digital ink pen touch on a cell containing a selectable option. Continuing with the example shown in FIG. 4, a hierarchical selection menu 420 linking metadata tag classes and their associated metadata tags is shown. Menu 420 is created and displayed in response to object tagging instruction 410 and initially shows metadata tag classes ("Attendees," "Priority," "Lifecycle") on a first level of menu 420. When a user selects one of the metadata tag classes ("Lifecycle") on the first level of menu 420 via touch input on interface 105, the metadata tags ("Requirements," "Design," "Implementation," "Verification," "Beta," "Gold Release") associated with the selected metadata tag class appear on a second level of menu 420 in cascading fashion.

Next, a selection of a metadata tag for appending to a selected object is received via touch input by a user on the hierarchical selection menu (915). Continuing with the example shown in FIG. 4, after migrating to the second level of menu 420, the user through touch input on interface 105 selects one of the metadata tags (e.g., "Requirements") displayed on the second level for applying to the selected object (e.g., "Collaborative Computing") as metadata. Where appropriate, more than one metadata tag may be selected for applying to the selected object.

Next, an entry in memory 115 associating the selected metadata tag and the selected object is created under the control of processor 110 (920). The selected object may be reformatted under the control of processor 110 into a computer-generated text string prior to storing the association in memory 115.

The method of FIG. 9 may then be repeated to populate memory 115 with a collection of user-defined tagged objects. Moreover, once an entry associating a metadata tag with an object has been created in memory 115, the entry may be amended by associating new objects with the tag or disassociating existing objects from the tag. Further, in some embodiments, whiteboard 100 includes access control settings allowing a user who creates a user-defined tagged object to specify through touch input on interface 105 whether the object is for his or her personal use only or is available for use by other users of whiteboard 100.

Figure 5:
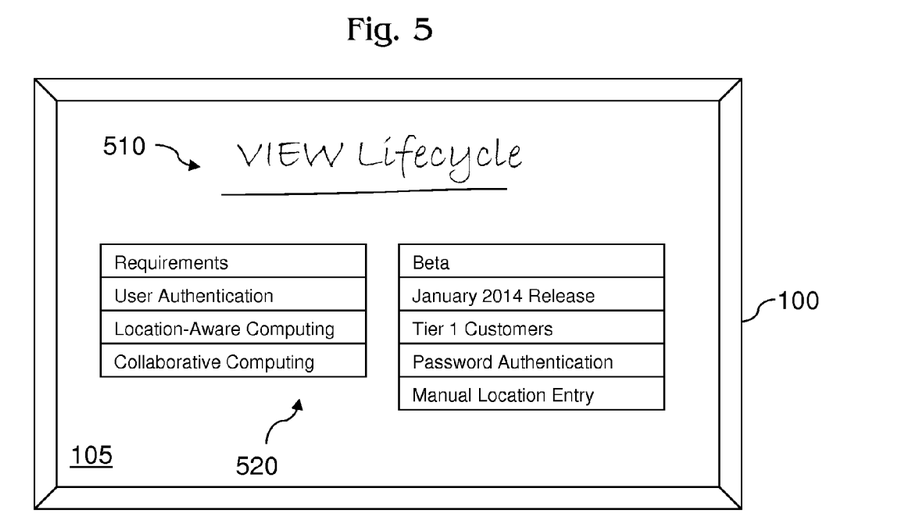
FIG. 5 shows exemplary tagged objects within a metadata tag class displayed on an electronic whiteboard, grouped by tag.
Figure 10:
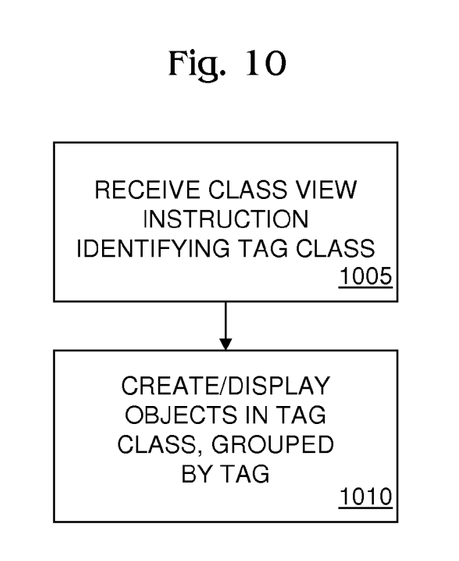
FIG. 10 shows a touch screen method for viewing tagged objects within a metadata tag class on an electronic whiteboard, grouped by tag.

Referring now to FIG. 10, a touch screen method for viewing tagged objects within a metadata tag class on whiteboard 100, grouped by tag, is shown. First, a class view instruction identifying a metadata tag class to be viewed is received via touch input on interface 105 (1005). The class view instruction may be a handwritten gesture in a syntax recognized by whiteboard 100 as a class view instruction. For example, in FIG. 5, a class view instruction 510 is a handwritten gesture having a class view notation ("VIEW") followed by a word identifying a metadata tag class to be viewed ("Lifecycle"), with both text elements of the gesture being underlined. Of course, in other embodiments electronic whiteboards may be configured to recognize class view instructions in other formats. Next, ordered lists of tagged objects in the metadata tag class, grouped by tag, are created under the control of processor 110 and displayed on interface 105 (1010). Each tagged object list identifies a metadata tag within the metadata tag class and one or more cells containing objects to which the tag has been applied. Continuing with the example shown in FIG. 5, tagged object lists 520 for the metadata tag class "Lifecycle" are shown. Tagged objects lists 520 are created and displayed in response to class view instruction 510 and each contains a header identifying a metadata tag (e.g., "Requirements") within the metadata tag class followed by cells containing objects ("User Authentication," "Location-Aware Computing," "Collaborative Computing") to which the tag has been appended. Note that in the example shown, tagged object lists are not displayed for the "Design," "Implementation," "Verification" and "Gold Release" metadata tags within the "Lifecycle" class owing to the fact that no objects are presently associated with those tags.

Tagged object lists displayed on interface 105 may be ordered in various ways, such as the order in which the metadata tags were added to memory 115 (e.g., earliest to latest, latest to earliest), alphabetically and numerically, or based on the number of objects to which the metadata tags have been applied (e.g., largest to smallest or smallest to largest). In some embodiments, whiteboard 100 includes settings allowing users to specify list-ordering criteria via touch input on interface 105.

The objects within tagged object lists displayed on interface 105 may also be ordered in different ways, such as the order in which the objects were tagged (e.g., earliest to latest, latest to earliest) or alphabetically and numerically. In some embodiments, whiteboard 100 includes settings allowing users to specify tagged object-ordering criteria via touch input on interface 105.

Figure 6:
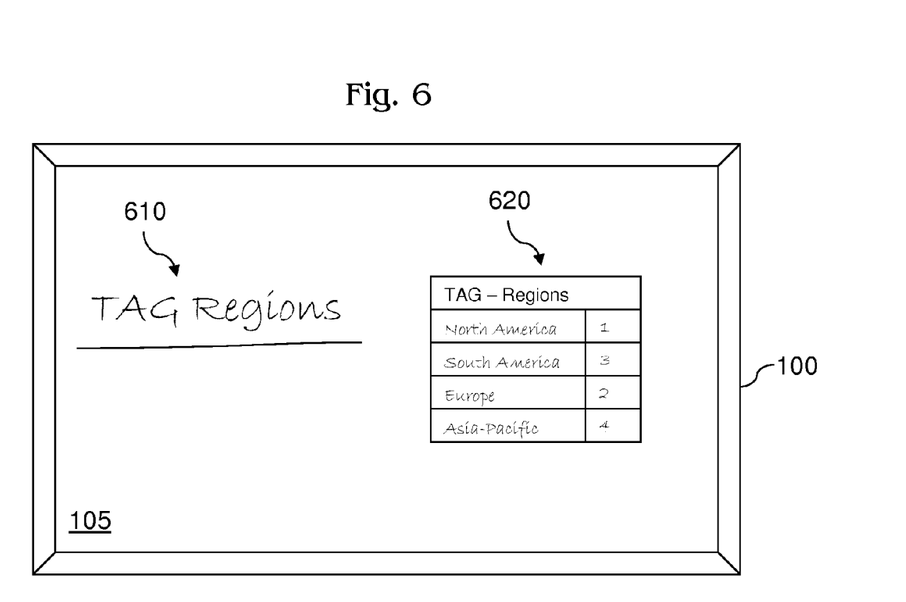
FIG. 6 shows an exemplary tag class configuration instruction and prioritized tag list displayed on an electronic whiteboard.
Figure 7:
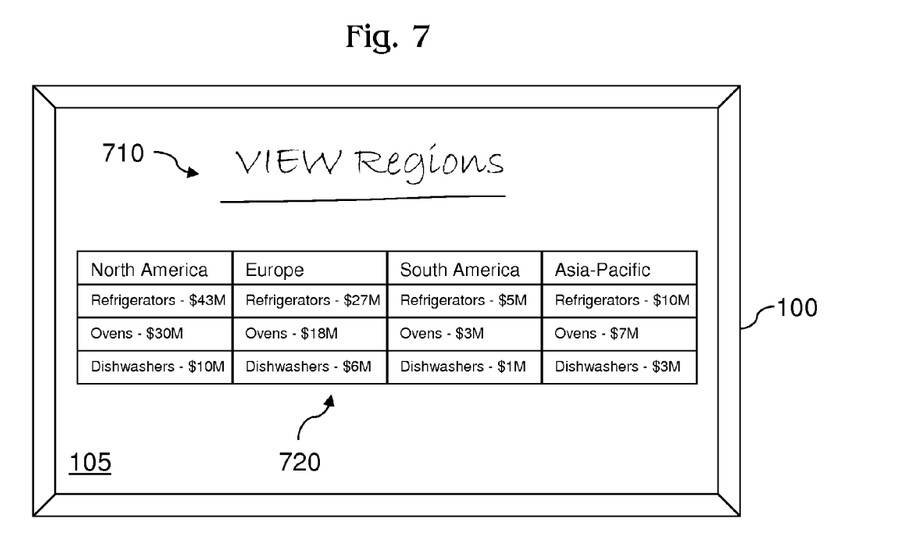
FIG. 7 shows exemplary tagged objects within a metadata tag class displayed on an electronic whiteboard, grouped by tag and ordered by priority.

In some embodiments, metadata tags are configured with priorities that are used to order the metadata tags when presenting them on the hierarchical selection menu and/or when presenting tagged object lists. Referring to FIG. 6, when a handwritten tag class configuration instruction 610 is received on interface 105 in these embodiments, an empty tag list for the metadata tag class is created and displayed on interface 105 under the control of processor 110. Handwritten metadata tags within the metadata tag class and assigned priorities are then entered into empty cells of the tag list, resulting in a prioritized tag list 620. An entry in memory 115 associating the metadata tag class, the metadata tags and their respective priorities is then created under the control of processor 110 from prioritized tag list 620. The priorities are thereafter applied to order the metadata tags when presenting them on the hierarchical selection menu and when presenting tagged object lists. For example, as shown in FIG. 7, when a class view instruction "VIEW Regions" 710 is received, tagged object lists 720 in the metadata tag class "Regions," grouped by metadata tags "North America," "Europe," "South America" and "Asia-Pacific" are created under the control of processor 110 and ordered on interface 105 from left-to-right in accordance with their associated metadata tag priorities "1," "2," "3," and "4" stored in memory 115. Priorities of metadata tags within a metadata tag class may be amended by providing as touch input on interface 105 a tag class configuration instruction identifying an existing class to be amended, whereupon a completed tag list for the class including the associated priorities is generated under the control of processor 110 by accessing the entry for the class from memory 115 and is displayed on interface 105 in an amendable format.

It will be appreciated by those of ordinary skill in the art that the invention can be embodied in other specific forms without departing from the spirit or essential character hereof. The present description is considered in all respects to be illustrative and not restrictive. The scope of the invention is indicated by the appended claims, and all changes that come within the meaning and range of equivalents thereof are intended to be embraced therein.

What is claimed is:

1. A touch screen method for configuring and applying metadata tags on an electronic whiteboard, comprising:
    receiving as first touch screen input on the electronic whiteboard a tag class configuration instruction identifying a metadata tag class;
    displaying on the electronic whiteboard in response to the tag class configuration instruction a tag configuration list for the metadata tag class;
    receiving as second touch screen input on the electronic whiteboard a plurality of metadata tags and associated metadata tag priorities for inclusion in the metadata tag class, wherein the metadata tags and the associated metadata tag priorities are received as handwritten characters in empty metadata tag cells and counterpart empty metadata tag priority cells within the tag configuration list;
    associating in a memory on the electronic whiteboard the metadata tag class with the metadata tags and the associated metadata tag priorities;
    receiving as third touch screen input on the electronic whiteboard an object tagging instruction identifying an object on the electronic whiteboard to be tagged with metadata;
    displaying, on the electronic whiteboard in response to the object tagging instruction using the associated metadata tag class, metadata tags and metadata tag priorities a hierarchical selection menu including the metadata tag class as a selectable option on a first level and the metadata tags as selectable options on a second level, wherein the metadata tags are ordered on the second level in accordance with the metadata tag priorities; and
    receiving as fourth touch screen input on the electronic whiteboard a selection from the hierarchical selection menu of one of the metadata tags whereby the identified object is tagged with the metadata.

2. The method of claim 1, wherein the tag class configuration instruction comprises a handwritten gesture in a syntax recognized by the electronic whiteboard as a tag class configuration instruction.

3. The method of claim 2, wherein the handwritten gesture comprises a tag class configuration notation accompanying a word identifying the metadata tag class.

4. The method of claim 1, wherein the metadata tags are received as handwritten words and the metadata tag priorities are received as handwritten numbers.

5. The method of claim 1, wherein the metadata tags are reformatted as computer-generated text strings by the electronic whiteboard prior to the associating step.

6. The method of claim 1, wherein the object tagging instruction comprises a handwritten gesture in a syntax recognized by the electronic whiteboard as an object tagging instruction.

7. The method of claim 1, wherein the hierarchical menu is a cascading menu.

8. The method of claim 1, wherein the second level of the hierarchical selection menu is outputted in response to a selection of the metadata tag class on the first level of the hierarchical selection menu.

9. The method of claim 1, further comprising:
    receiving as fifth touch screen input on the electronic whiteboard a tag class view instruction identifying the metadata tag class; and
    displaying on the electronic whiteboard in response to the tag class view instruction, using the associated metadata tag class, metadata tags and metadata tag priorities, tagged object lists for individual ones of the metadata tags in the metadata tag class identifying objects tagged with the ones of the metadata tags, wherein the tagged object lists are ordered in the display in accordance with the metadata tag priorities of the ones of the metadata tags.

10. An electronic whiteboard, comprising:
    a memory;
    a touch screen interface configured to receive as first input a tag class configuration instruction identifying a metadata tag class, display a tag configuration list for the metadata tag class, receive as second input a plurality of metadata tags and associated metadata tag priorities for inclusion in the metadata tag class, wherein the metadata tags and the associated metadata tag priorities are received as handwritten characters in empty metadata tag cells and counterpart empty metadata tag priority cells within the tag configuration list, receive as third input an object tagging instruction identifying an object to be tagged with metadata, display as output a hierarchical selection menu including the metadata tag class as a selectable option on a first level and the metadata tags as selectable options on a second level, wherein the metadata tags are ordered on the second level in accordance with the metadata tag priorities, and receive as fourth input a selection from the hierarchical selection menu of one of the metadata tags, whereby the identified object is tagged with the metadata; and a processor communicatively coupled with memory and the touch screen interface configured to associate in the memory the metadata tag class with the metadata tags and the associated metadata tag priorities and generate the hierarchical selection menu using the associated metadata tag class, metadata tags and metadata tag priorities.

11. The electronic whiteboard of claim 10, wherein the tag class configuration instruction comprises a handwritten gesture in a syntax recognized by the electronic whiteboard as a tag class configuration instruction.

12. The electronic whiteboard of claim 10, wherein the metadata tags are received as handwritten words and the metadata tag priorities are received as handwritten numbers.

13. The electronic whiteboard of claim 10, wherein the metadata tags are reformatted as computer-generated text strings by the processor prior to associating in the memory the metadata tag class, the metadata tags and the metadata tag priorities.

14. The electronic whiteboard of claim 10, wherein the object tagging instruction comprises a handwritten gesture in a syntax recognized by the electronic whiteboard as an object tagging instruction.

15. The electronic whiteboard of claim 10, wherein the hierarchical menu is a cascading menu.

16. The electronic whiteboard of claim 10, wherein the second level of the hierarchical selection menu is outputted in response to a selection of the metadata tag class on the first level of the hierarchical selection menu.

17. The electronic whiteboard of claim 10, wherein the touch screen interface is further configured to receive as fifth input a tag class view instruction identifying the metadata tag class and display in response to the tag class view instruction, using the associated metadata tag class, metadata tags and metadata tag priorities, tagged object lists for individual ones of the metadata tags in the metadata tag class identifying objects tagged with the ones of the metadata tags, wherein the tagged object lists are ordered in the display in accordance with the metadata tag priorities of the ones of the metadata tags.

* * * * *